United States Patent

[11] 3,576,493

| [72] | Inventors | Henry N. Tachick<br>Pittsfield;<br>Richard H. Arndt, Lenox, Mass. |
|---|---|---|
| [21] | Appl. No. | 860,967 |
| [22] | Filed | Sept. 25, 1969 |
| [45] | Patented | Apr. 27, 1971 |
| [73] | Assignee | General Electric Company |

[54] MOLDED CONDUCTOR HOUSING WITH A MOLDED CAPACITANCE TAP AND METHOD OF MAKING SAME
7 Claims, 5 Drawing Figs.

[52] U.S. Cl. .................................................. 324/133,
339/113, 340/248, 29/629
[51] Int. Cl. ............................................... G01r 19/16
[50] Field of Search .......................................... 174/11.3,
18, 73, 142, 143, 152; 340/248, 252; 339/113,
143; 324/122, 133; 29/592, 629, 630

[56] References Cited
UNITED STATES PATENTS

| 2,135,338 | 11/1938 | Higgins | 174/11(.3)UX |
| 3,231,666 | 1/1966 | Frink | 174/142 |
| 3,390,331 | 6/1968 | Brown et al. | 174/11(.3)UX |
| 3,401,370 | 9/1968 | Weinfurt et al. | 339/143X |
| 3,466,593 | 9/1969 | Arndt et al. | 174/18UX |

*Primary Examiner*—Laramie E. Askin
*Attorneys*—Francis X. Doyle, Vale P. Myles, Frank L. Neuhauser, Oscar B. Waddell and Joseph B. Forman ABSTRACT: A capacitance divider for deriving power from, and detecting electrical energization of, an electrical conductor embedded in a body of insulating material is constructed by forming a cavity in the insulating material and bonding a layer of conductive elastomeric material to the inner surface of the cavity at a predetermined position between the embedded conductor and a conductive ground shield on the outer surface of the insulating material, thereby to afford a voltage dividing capacitance tap electrode from which measurements can be taken in a conventional manner.

Patented April 27, 1971
3,576,493
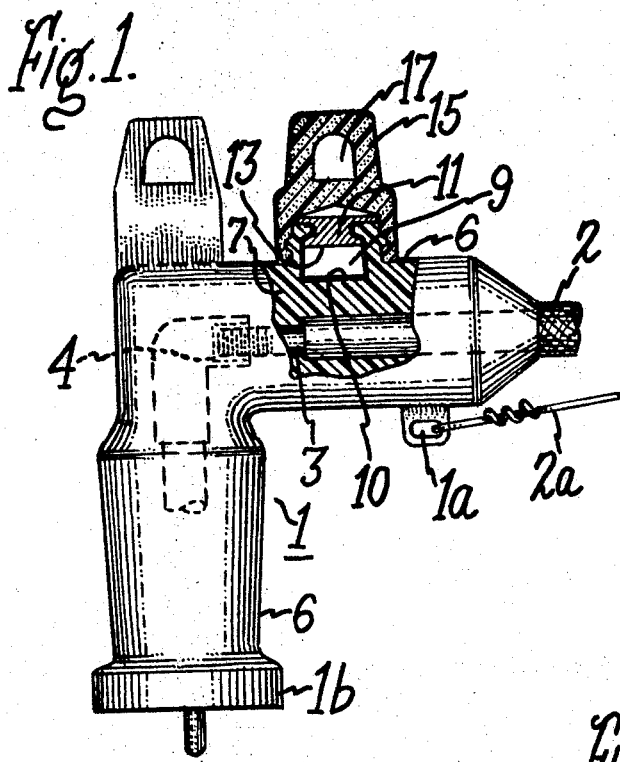
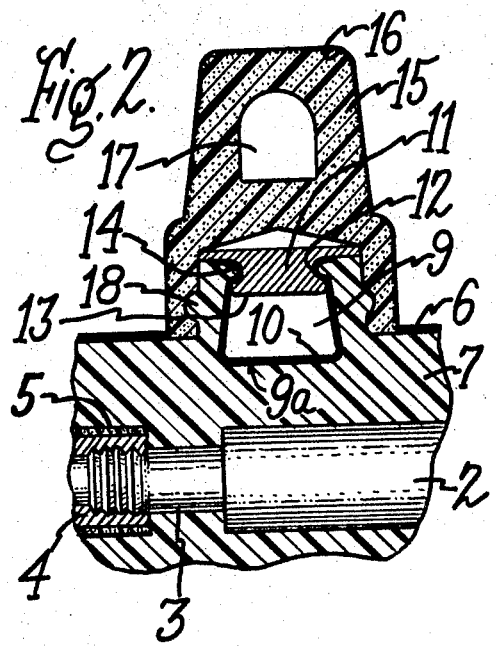
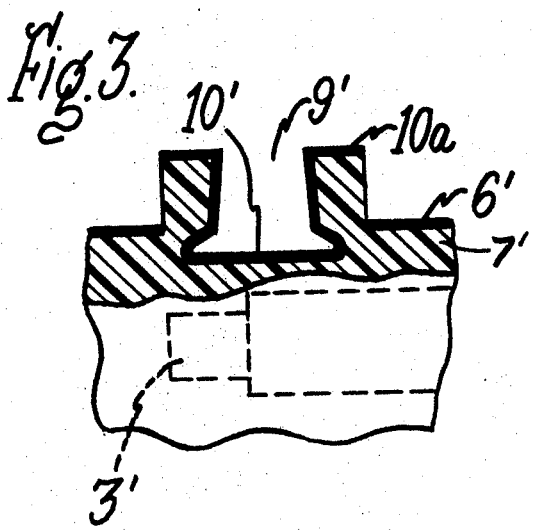
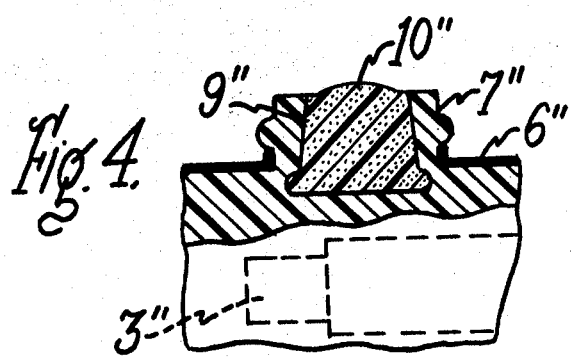
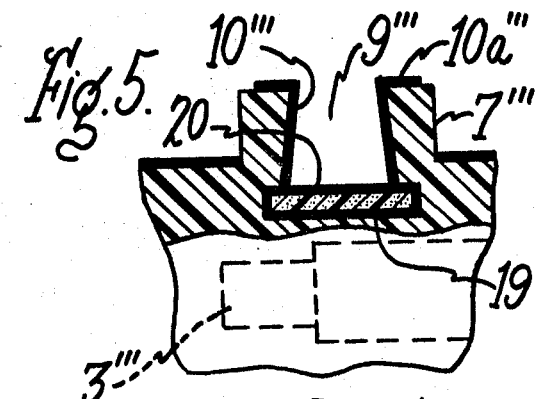
Inventors,
Henry N. Jachick,
Richard H. Arndt,
Vale P. Myles
by Their Attorney.

MOLDED CONDUCTOR HOUSING WITH A MOLDED CAPACITANCE TAP AND METHOD OF MAKING SAME

This invention relates to means for indicating the presence or absence of electric voltage on insulated electrical conductors such as shielded cable and terminations used in underground power distribution systems.

It is conventional practice in the field of underground power distribution to provide power cable terminations with capacitance tap means that are designed to be used in conjunction with a statiscope or other suitable voltage indicating means to afford personnel working on such systems a method of determining whether or not the system is energized. One such capacitance tap arrangement in combination with a cable termination module is described and claimed in U.S. Pat. No. 3,343,153 to Waehner. A major problem involved in manufacturing capacitance divider means of the type shown and claimed in this patent for use on a molded cable termination arises from the fact that the embedded capacitance plate must be carefully maintained in a predetermined position with respect to the embedded primary conductor of the termination during manufacture of the termination, which ordinarily entails a high-pressure molding step. In fact, the foregoing patent recognizes this problem and offers one solution to it; namely, the provision of a rodlike member integral with the embedded capacitance tap which is sufficiently strong to hold the capacitance tap plate in position during the operation in which the termination body is molded. Another major drawback to the type of conventional embedded capacitance tap arrangement shown in the foregoing patent stems from the fact that it is relatively expensive to manufacture.

The foregoing problem and disadvantages are overcome with the present invention which, briefly stated, comprises a unique type of capacitance tap arrangement for use with an embedded conductor of the type encountered on underground cable terminations. In one preferred form of the present invention, a power cable termination module formed of a molded elastomeric material and coated with a semiconducting electrical ground shield is provided with a capacitance tap mounted in the insulating body of the termination by forming a cavity in this body at the center of a window in the ground shield. The interior surface of this cavity is coated with a conductive elastomeric material and a conductive contact disc is then snapped partially into the cavity where it is retained by resilient detent means in electrically conducting relation with the conductive coating bonded to the cavity's walls. Of course, the lowermost surface of the cavity is positioned closer to the primary electrode of the termination than is the ground shield on the outer surface of the termination, therefore, it provides capacitance divider means for developing a potential between the ground shield and the partially embedded contact that is directly proportional to the voltage on the primary electrode.

A primary object of the invention is to provide an improved capacitance divider arrangement for indicating the presence of electrical voltage on a conductor that is embedded in a layer of insulating material.

Another object of the invention is to provide a capacitance tap arrangement that is rugged in construction and inexpensive to manufacture.

Yet another object of the invention is to provide a flexible capacitance tap arrangement for use with a molded elastomeric conductor housing, which will not damage the housing if it is flexed with the capacitance tap embedded therein.

A still further object of the invention is to provide a capacitance tap arrangement for an electric power cable termination which can be manufactured with simple techniques and still afford an easily controlled, accurate capacitance divider arrangement with respect to the primary conductor in the termination and a ground shield plane on the outer surface thereof.

Other objects and advantages of the invention will become apparent from the following description, taken in conjunction with the drawings in which:

FIG. 1 is a side elevation view, partly in cross section, of an electric power cable termination module shown with respect to a portion of a power cable to which it is connected and illustrating a preferred embodiment of a capacitance divider constructed in accordance with the present invention.

FIG. 2 is an enlarged sectional side elevation view of a capacitance divider of the type shown in FIG. 1.

FIG. 3 is a sectional side elevation view of a second embodiment of a capacitance divider constructed in accordance with the present invention.

FIG. 4 is a sectional side elevation view, in cross section, of still another embodiment of a capacitance divider constructed pursuant to the present invention.

FIG. 5 is a sectional side elevation view, in cross section, of yet another embodiment of a capacitance divider manufactured in accordance with the teaching of the present invention.

Referring now to FIG. 1 of the drawing, there is shown a conductor cable termination module 1 in the form of an elbow, which is electrically and mechanically connected to a high voltage electrical cable 2 in a conventional manner in which the cable is prepared by stripping a portion of its insulation away from one end thereof and crimping this end of the exposed cable into a contact 3 that is then force fitted into the body of termination 1 and coupled to an embedded contact 4 therein. The exposed end of cable 2 and the contact 4 are surrounded by a body of conductive elastomeric material 5 which prevents corona from forming at the irregular surfaces of these elements. As is standard practice, one strand 2a of the concentric neutral copper sheath on cable 2 is inserted through an eye 1a formed in the module 1 and secured thereto to assure good electrical contact between the armor strand and an electrical conductor in the form of a uniform layer of conductive material 6 that may be of any conventional type. In the preferred embodiment of the invention, the layer of conductive material 6 is formed by spraying or painting the termination 1 with a conductive elastomeric material that is then cured in place on the termination 1 to form a uniform conductive coating over substantially the entire outer surface of the termination 1, except for the flange 1b at the conductor-coupling end of the termination. Also, in this preferred embodiment of the invention, the insulating layer or body of material 7 of termination 1 is formed of a high dielectric strength moldable elastomeric material of any suitable type well known in the art. In the position shown, the cable contact 3 is electrically coupled to the embedded conductor 4 by being threaded together so that both of these contacts are securely embedded within the layer of insulating material 7 of termination 1.

In order to provide a capacitance divider for detecting the presence of electric potential on the embedded conductors 3 or 4, pursuant to the present invention, a cavity 9 is formed in the layer of insulating material 7 to a predetermined depth such that its bottom surface 9a is a predetermined distance from both the embedded conductor 3 and the conductive coating 6 on the outer surface of termination 1. A coating of conductive elastomeric material similar to that used to form the electrical conductive material 6 on the outer surface of the termination 1, is mounted on the inner surface of cavity 9. A disc-shaped contact 11 is positioned at the upper edge of the cavity 9 and is secured in that position by an integral groove 12 on its lower protruding portion 13 which extends partially into the cavity 9. Also, an annular ridge 14 is formed adjacent the upper edge of the cavity 9 and it is adapted to cooperate with the groove 12 to resiliently hold the contact 11 in position in the cavity when the flexible walls of the cavity are expanded during the insertion of the contact 11 into operating position, as shown.

Thus, a pressure contact is formed between the conductive coating 10 and the surfaces of the contact 11 to assure good electrical conductance therebetween. Accordingly, in operation of the invention, when a statiscope (not shown), or other suitable voltage detecting means, is placed on contact 11 or connected between contact 11 and the conductive material 6, or other suitable ground potential point, the voltage gradient generated by the respective capacitance couplings between the embedded energized conductors 3 or 4, and the molded conductive electrode 10 in cavity 9, and the capacitance between electrode 10 and ground plane 6, serve to afford a means of indicating the amount of voltage on the embedded conductors 3 and 4 in a manner well known in the art, as described in more detail in the above-mentioned U.S. Pat. No. 3,343,153 to Waehner.

An insulating cover 15 having a conductive outer coating 16 thereon is provided to protect the capacitance divider contact 11 from contamination by moisture and other materials when the termination 1 is in normal operating position and there is no need to use the capacitance divider. Of course, if desired, the entire cover 15 may be made of conductive material. The cover 15 is provided with a window 17 which can be engaged by a hook stick to remove the cover when it is desired to put the capacitance divider of the invention into operation. It will be noted that when the cover is in its sealing position over the capacitance divider, the conductive coating 16 is in electrical contact with the ground coating material 6 on the termination 1 so that the ground plane of the termination is not interrupted.

It has been found that a particularly desirable feature of the preferred embodiment of the invention resides in the fact that the bottom surface 9a can be precisely spaced with relation to the outer surface of module 1 and the embedded conductors 3 and 4 without the need for expensive molding tools during its manufacture. It should be apparent that the cavity 9 can be formed by a proper die surface on the mold for the remainder of termination 1 so that the cavity 9 is formed in the same operation used to manufacture termination 1. Subsequently, the conductive coating 10 may be painted or sprayed onto the surface of cavity 9, then cured in place. A further advantage of this particular embodiment of the invention is that there is no rigid metal contact having sharp cutting edges embedded in the elastomeric insulating material 7 of termination 1. Accordingly, when the capacitance tap insulating portion of termination 1 is flexed during normal operating use, for example when the cover 15 is removed from its sealing position thereon, by flexing the detent ring 18 on termination 1 inward, there is no tendency to injure the termination body by cutting it with such an embedded electrode. Instead, the walls of cavity 9 and coating 10 simply yield inward under contact 11, then snap back into their normal positions. This safety feature is particularly advantageous in cable terminations of the type depicted because it prevents the formation of small crevices adjacent the capacitance tap electrode into which contaminating impurities might be collected, which could distort the accuracy of measurements taken from the capacitance tap over a period of years.

Referring now to FIG. 2 of the drawing, there is shown an enlarged cross-sectional view of the capacitance divider arrangement shown in FIG. 1, with a minor modification therein. In this and subsequently described FIGS., like parts will be designed with the same reference numerals used in FIG. 1. Specifically, a portion of insulating layer 7 is shown having a cavity 9 formed therein and a conductive elastomeric coating 10 is formed over the entire inner surface of the cavity 9. In this embodiment of the invention, the conductive coating 10 terminates at the edge of the cavity rather than extending over the edge into contact with the bottom surface of the metal contact 11 as was the case with the embodiment shown in FIG. 1. However, the annular ridge 14 adjacent the upper edge of cavity 9 is still formed to cooperate with the annular detent 12 in projecting portion 13 of the contact 11 to retain the contact in operating position sa described above with reference to FIG. 1. It has been found that with the pressurized contact afforded by the flexible walls of cavity 9, adequate electrical coupling is provided between contact 11 and coating 10 to provide good readings on a statiscope connected to the contact 11.

In FIG. 3 of the drawing, another modification of the invention is shown. In this form of the invention, a layer of insulating material 7' having a conductive elastomeric material 6' thereon is provided with a cavity 9' formed in the insulating layer 7' at a window in the conductive material 6'. The entire inner surface of cavity 9' is coated with a moldable elastomeric conductive material, 10', which extends beyond the upper edge of the cavity 9' to form a smooth generally flat contact surface 10a which is adapted to be contacted directly by a statiscope in much the same manner as was the contact 11 of FIG. 1. In this embodiment of the invention, no additional metal contact is needed to afford the capacitance divider function necessary to detect voltage on the embedded energized conductors 3 and 4.

In FIG. 4, there is depicted still another embodiment of the present invention. A layer of insulating material 7'' having a coating of conductive elastomeric material 6'' on the outer surface thereof is provided with a cavity therein 9'' which, in this embodiment of the invention, is completely filled with a body of conductive, elastomeric, moldable material 10'' which is formed to extend at least up to the edge of the cavity 9'' and preferably slightly beyond the cavity's edge. Therefore, a statiscope can be placed directly in contact with this body 10'' of conductive elastomeric material to detect the presence of voltage thereon due to capacitance coupling with the energized embedded conductor 3'', if such a voltage is present.

Finally, in FIG. 5 of the drawing, there is shown an embodiment of the invention in which a capacitance divider in a layer of insulating material 7''' is formed by providing a cavity 9''' therein coated with a layer of elastomeric material 10''' which extends over the entire inner surface of the cavity and projects beyond the upper edge thereof. In this embodiment of the invention, a metal contact disc 19 is embedded in the layer of insulating material 7''' and this disc 19 is in electrical contact with at least a portion of the conductive coating 10''' so that its capacitance coupling with embedded conductor 3''' can be detected by placing a statiscope on the upper surface of the conductor coating 10a''' which extends beyond the edges of the cavity 9'''. In this embodiment of the invention, means would have to be provided for holding disc 19 in its desired position while the layer of insulating material 7''' is molded around it. Toward this end disc 19 is tapped with a threaded bore 20 into which a rod can be screwed to support the disc rigidly in position while it is molded in place.

It will be apparent from the foregoing description that the various embodiments of the invention can be utilized in combination with other types of embedded conductors than the particular power cable termination module with which it is described hereinabove. Therefore, it is our intention in the following claims to encompass all such modifications and improvements of the invention as fall within their true scope. What we claim and desire to secure by Letters Patent of the United States is:

We claim:

1. A capacitance divider for detecting electrical energization of an elongated electrical conductor embedded in a layer of insulating material comprising; a layer of insulating material mounted concentrically around said elongated electrical conductor, a second electrical conductor comprising a layer of conductive elastomeric material mounted on and bonded to an outer surface of said insulating material, means defining a cavity in said insulating material, said cavity having a bottom surface the entire area of which is positioned on one side of said elongated conductor, a coating of conductive elastomeric material mounted on and covering substantially all of the surface of said cavity and extending a predetermined distance beyond the upper edge of the cavity along the surface of said insulating material thereby to form an electrical contact on said insulating surface that is electrically coupled to the conductive coating in said cavity, said conductive material mounted on the surface of said cavity being closer to the embedded conductor than is the electrical conductor mounted on the outer surface of the insulating material whereby a potential difference is detectable between said conductive material and said conductor mounted on the insulating material when said embedded conductor is energized.

2. A capacitance divider as in claim 1 including a metal conductive plate embedded in said layer of insulation and spaced predetermined distances from the embedded conductor and the conductor mounted on said outer surface, said conductive plate being positioned in electrical contact with the conductive material mounted on said cavity.

3. A capacitance divider for detecting electrical energization of an elongated electrical conductor embedded in a layer of insulating material comprising; a layer of insulating material mounted concentrically around said elongated electrical conductor, a second electrical conductor mounted on an outer surface of said insulating material, means defining a cavity in said insulating material, said cavity having a bottom surface the entire area of which is positioned on one side of said elongated conductor, a coating of conductive material mounted on at least a portion of the surface of said cavity, said conductive material mounted on the surface of said cavity being closer to the embedded conductor than is the electrical conductor mounted on the outer surface of the insulating material whereby a potential difference is detectable between said conductive material and said conductor mounted on the insulating material when said embedded conductor is energized, electrical contact means comprising a removable molded contact body formed of conductive, elastomeric material having detent means engaging the walls of said cavity to retain the contact body in position in the cavity, the walls of said cavity being shaped to cooperate with said detent means to afford said position retaining function.

4. A capacitance divider for detecting electrical energization of an elongated electrical conductor embedded in a layer of insulating material comprising; a layer of insulating material mounted concentrically around said elongated electrical conductor, a second electrical conductor mounted on an outer surface of said insulating material, means defining a cavity in said insulating material, said cavity having a bottom surface the entire area of which is positioned on one side of said elongated conductor, a coating of conductive material mounted on at least a portion of the surface of said cavity, said conductive material mounted on the surface of said cavity being closer to the embedded conductor than is the electrical conductor mounted on the outer surface of the insulating material whereby a potential difference is detectable between said conductive material and said conductor mounted on the insulating material when said embedded conductor is energized, electrical contact means mounted adjacent the upper edge of said cavity, said contact means being separated from said conductor mounted on the outer surface of the insulating material a distance sufficient to prevent electrical tracking therebetween, and electrical circuit means coupled to electrically connect said contact means to said coating of conductive material, said electrical circuit means comprising an integral extension of said coating of conductive material that is held in pressurized contact with a part of said contact means.

5. A capacitance divider as in claim 4, wherein said contact means comprises a metal member having a generally smooth contact surface and having detent means engaging the walls of said cavity to retain the contact in position in the cavity, the walls of said cavity being shaped to cooperate with said detent means.

6. A capacitance divider as in claim 5 wherein the preformed walls of said cavity adapted to cooperate with said detent means are shaped to form an annular flexible ridge adjacent the upper edge of the cavity, and said detent means comprises an annular groove formed in the contact means on a protruding portion thereof that is in engagement with said annular ridge thereby to retain the contact in position in the cavity.

7. A method of manufacturing a capacitance divider for detecting electrical energization of an electrical conductor embedded in a body of insulating material comprising the steps of, forming a cavity of predetermined depth and configuration in said body of insulating material, coating a predetermined portion of said cavity with at least one flexible layer of a curable conductive material, curing said coating thereby to cause it to adhere to the surface of said cavity, and releasably mounting a metal contact member over the upper edges of said cavity in electrical conducting relation with said coating, whereby said contact member is capacitively coupled to the embedded conductor by means of its conducting relationship with the coating on said cavity.